Jan. 12, 1943. D. J. CRAWFORD 2,307,759
PERISCOPE
Filed July 11, 1941 2 Sheets-Sheet 1
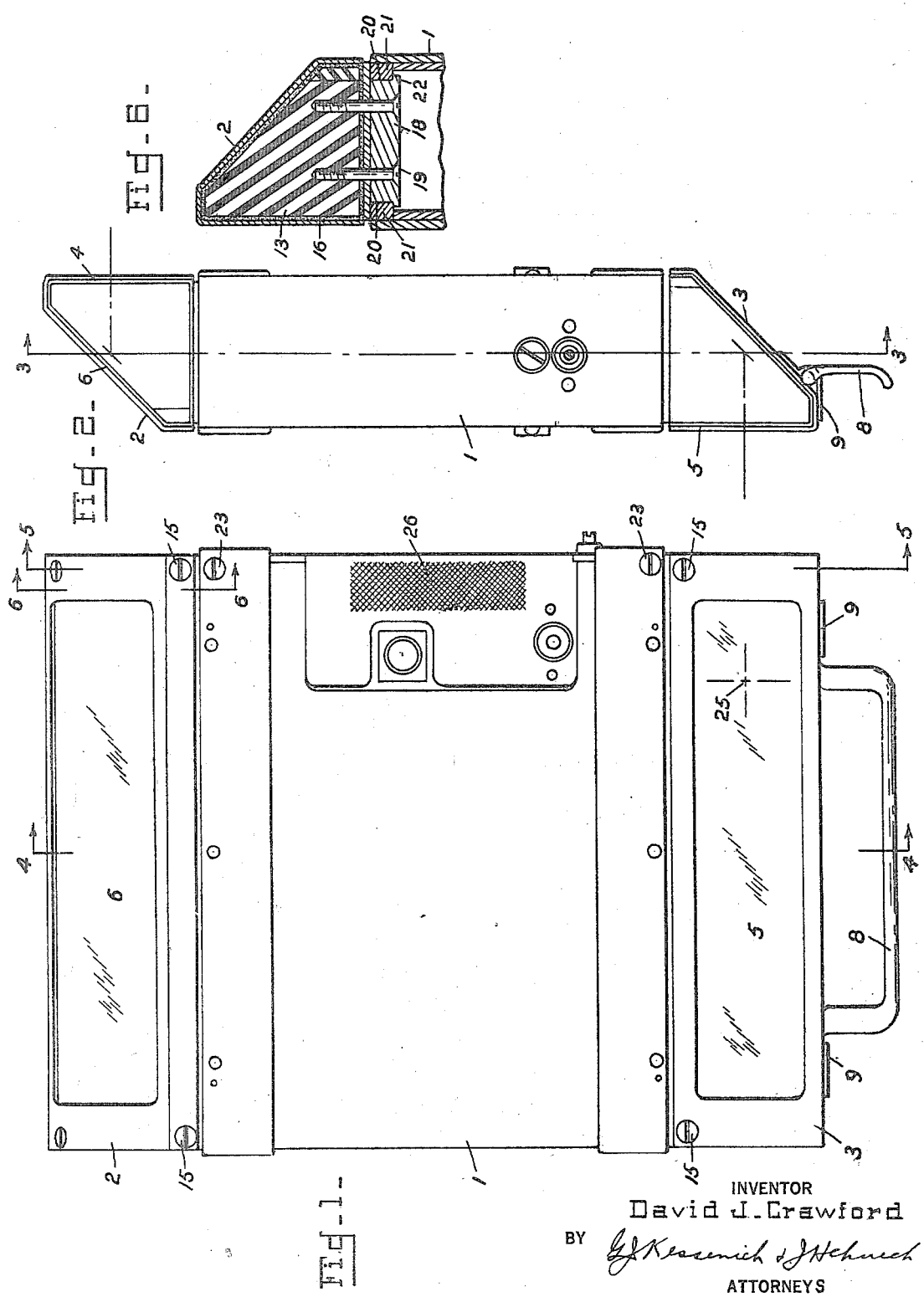
INVENTOR
David J. Crawford
BY
ATTORNEYS Jan. 12, 1943.                D. J. CRAWFORD                2,307,759
                                 PERISCOPE
                           Filed July 11, 1941            2 Sheets-Sheet 2
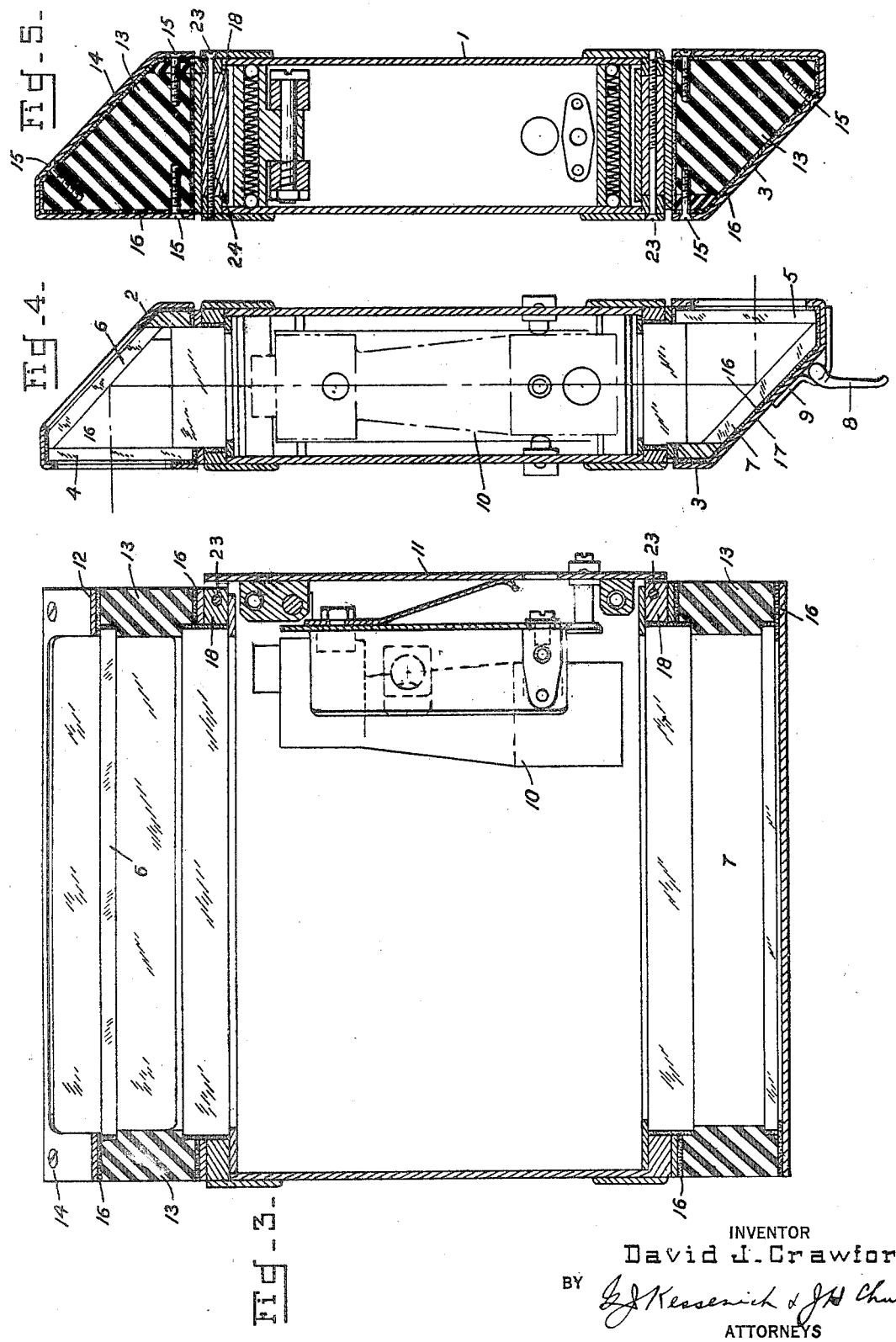
INVENTOR
David J. Crawford
BY
ATTORNEYS Patented Jan. 12, 1943

2,307,759

UNITED STATES PATENT OFFICE 2,307,759

PERISCOPE

David J. Crawford, United States Army, Durant, Miss.

Application July 11, 1941, Serial No. 401,987

9 Claims. (Cl. 88—68)

(Granted under the act of March 3, 1883, as amended April 30, 1928; 370 O. G. 757)

The invention described herein may be manufactured and used by or for the Government for governmental purposes, without the payment to me of any royalty thereon.

This invention pertains to optical devices. More particularly it relates to a periscope which permits wide angle vision and is adapted for use in directing gunfire.

Armored contrivances can be operated more effectively when equipped with optical devices which permit a quick survey of a greater part of the horizon and provide self-contained means for assisting in lining up guns with targets.

An object of the invention is to provide a periscope which gives an observer a broad field of vision and permits almost simultaneous determination of the alignment of a gun with a target.

A further object is to provide a periscope with reflecting units which can be removed readily when injured by projectiles.

Other objects and advantages will be apparent from the following detailed description, in which:

Fig. 1 is a front elevation of the periscope housing.

Fig. 2 is a side elevation thereof.

Fig. 3 is a central, longitudinal section on the line 3—3 of Fig. 2.

Fig. 4 is a central vertical section on the line 4—4 of Fig. 1.

Fig. 5 is a section on the line 5—5 of Fig. 1, and

Fig. 6 is a section on the line 6—6 of Fig. 1 showing details of construction.

According to a preferred embodiment, the periscope is composed of a container-like body portion 1 to which demountable end assemblies 2 and 3 are connected. The end assemblies 2 and 3 house the windows 4 and 5 and also the reflecting mirrors 6 and 7. (See Fig. 4.) Prisms may be employed in lieu of the windows and mirrors. The mirrors 6 and 7 are positioned in the conventional manner to direct a ray of light (shown by a dot-dash line in Figs. 2 and 4) through the body portion 1 of the periscope. The windows and mirrors are of sufficient length to give a wide field of view to an observer stationed adjacent window 5. The lower end of the periscope has a handle 8 suspended from suitable brackets 9 to facilitate removal of the periscope from an armored journal (not shown).

As shown in Fig. 3 a telescope 10 is mounted adjustably and resiliently within the body 1 on a side wall 11. The telescope per se and the adjustment features form no part of the present invention and will not be described.

As shown in Fig. 3, the narrow ends of the angularly disposed mirror 6 rest in recesses 12 in blocks 13 of plastic or other material. The window 4 is held similarly in position. A metallic frame 14 with openings slightly smaller than the window 4 and mirror 6 engage the glass edges and completes the frame structure of the end member 2. Screw fasteners 15 anchor the blocks 13 to the metal frame 14. Rubber or other gasket material 16 is employed to provide a resilient and a fluidtight mounting between the glass and other frame members.

End assembly 3 is constructed similarly to assembly 2. It differs chiefly in that a metallic backing plate 17 covers the entire rear area of the mirror so that none of that portion is exposed. This eliminates much of the danger of breaking as a result of inadvertent handling. A handle 8 is hinged to end assembly 3 by brackets 9 as previously mentioned.

Fig. 6 illustrates the manner the end assembly 2 engages the body portion 1 of the periscope. Short bars 18 are fastened to the blocks 13 of the end assembly 2 by suitable means such as screws 19. On opposite sides of a bar 18 are channels 20. Shoulders 21 on the sides of box 1 engage the channels 20 and form a trackway permitting sliding engagement between the box 1 and the end assembly 2. Shoulders 22 on the bar 18 prevent vertical disengagement of the body 1 and the reflector assembly 2. A screw 23 shown in Fig. 5 passes through the side walls of the periscope 1 and a bore 24 in bar 18 and secures the reflector assembly 2 to the periscope body. End assembly 3 is attached to the periscope body 1 in the same fashion.

The reflecting member 2 is a simple frame structure with a frangible window 4 and mirror 6. A projectile may strike one or both and shatter them so as to render them useless. The sliding fit between the end member 2 and the periscope body 1 enables the reflecting member 2 to be replaced with a minimum of effort and loss of time, thus promoting the efficiency of the armored contrivance from a military standpoint. The open construction to the rear of glass mirror 6 exposes little metal to the path of an enemy projectile and effectively reduces the resulting disruption and distortion of metal members. Such distortion would prevent easy withdrawal of the periscope from its armored mounting (not shown) for replacement purposes.

The telescope 10 employed has no magnifying power and is equipped with a reticule or crosswire (not shown). An observer stationed with his eyes near the right-hand side of the lower window 5 will observe the image of the cross-wire at 25. (See Fig. 1.)

The telescope assembly may be withdrawn by grasping the knurled grip 26 shown in Fig. 1 and pulling it to the right. This then permits the mirror assemblies 2 and 3 to be separated from the periscope body 1. By removing the screws 23 these end members 2 and 3 can slide out of engagement with the body 1.

The operation of the periscope is as follows: The observer is stationed with his eyes approximately six inches from the lower window 5. The appreciable width of the periscope enables him to view conveniently a large part of the horizon. Upon observing a target through the periscope proper, it will be necessary to line up the gun with the target preparatory to firing. The telescope employed is collimated with the gun by suitable means which does not constitute a part of this invention. The periscope and gun are rotated simultaneously until the image of the target falls on the reticule of the telescope. This indicates the proper aim has been taken and the gun may be discharged so that its projectile will strike the target.

The periscope enables the operator to scan the horizon until a target is noticed. By closing the left eye and observing with the right eye until the target falls on the cross-wire, the operator will be able to train his gun quickly on that target with no change in his position. Thus the periscope with its self-contained telescope accomplishes a double purpose.

I claim:

1. In a wide angle periscope, a telescope mounted therein, and a reticule in said telescope for sighting on a target, said periscope and telescope arranged for simultaneous use by an observer in scanning the horizon and aiming an object to be pointed.

2. In combination, a panoramic periscope, a telescope adjustably mounted therein for collimating with the axis of a gun, and a graticule in said telescope to facilitate lining up a gun.

3. An optical device comprising, a wide angle periscope having a single viewing aperture and a single sighting aperture, and a telescope having a relatively limited field of vision operatively associated with the light system of said periscope and including a reticule to facilitate aiming a gun.

4. In an optical device, a panoramic periscope for unobstructed scanning of the horizon, a telescope having a limited field of vision operatively associated with and at one side of the light system of the periscope for collimating with a gun and having a reticule for sighting on a target, said periscope and telescope adapted for instantaneous use.

5. An optical device comprising, a wide angle periscope for observing the horizon, a telescope having a relatively limited field of vision optically associated with the light system of the periscope at one side of the periscope, and a reticule in said telescope for sighting on a target, said periscope and telescope adapted for simultaneous use by an observer.

6. In combination, a panoramic periscope, and a single power telescope therein having a cross-wire for sighting on a target, said periscope and telescope arranged for simultaneous use by an observer.

7. In combination, a panoramic periscope including a pair of spaced reflectors, a telescope adjustably mounted between said reflectors and in the optical path thereof, and a reticule in said telescope for sighting on a target.

8. In combination, a periscope having a pair of spaced reflectors for surveying a broad horizon, a telescope between said reflectors in the optical path to one side thereof, and a reticule in said telescope for sighting on an object.

9. In an optical device, a panoramic periscope having a pair of spaced reflectors, a telescope having a relatively narrow field of vision adjustably mounted between said reflectors in their light path and at one side thereof, and a reticule in said telescope for sighting on a target.

DAVID J. CRAWFORD.